United States Patent
Albrecht et al.

(10) Patent No.: US 11,436,712 B2
(45) Date of Patent: Sep. 6, 2022

(54) PREDICTING AND CORRECTING VEGETATION STATE

(71) Applicant: INTERNATIONAL BUSINESS MACHINES CORPORATION, Armonk, NY (US)

(72) Inventors: Conrad M. Albrecht, White Plains, NY (US); Hendrik F. Hamann, Yorktown Heights, NY (US); Levente Klein, Tuckahoe, NY (US); Siyuan Lu, Yorktown Heights, NY (US); Sharathchandra Pankanti, Darien, CT (US); Wang Zhou, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 16/658,533

(22) Filed: Oct. 21, 2019

(65) Prior Publication Data

US 2021/0118117 A1    Apr. 22, 2021

(51) Int. Cl.
*G06T 7/00* (2017.01)
*G06N 5/04* (2006.01)
(Continued)

(52) U.S. Cl.
CPC .......... *G06T 7/0002* (2013.01); *G06K 9/6256* (2013.01); *G06N 3/084* (2013.01);
(Continued)

(58) Field of Classification Search
CPC ........ G06N 5/046; G06N 20/00; G06N 3/084; G06N 3/0454; G06K 9/4628;
(Continued)

(56) References Cited

U.S. PATENT DOCUMENTS 7,031,927 B1   4/2006   Beck et al.
7,702,597 B2   4/2010   Singh et al.
(Continued)

FOREIGN PATENT DOCUMENTS

CN   103034910     4/2013
CN   105787457 A   7/2016
(Continued)

OTHER PUBLICATIONS

Zhang C, Durgan SD, Lagomasino D. Modeling risk of mangroves to tropical cyclones: A case study of Hurricane Irma. Estuarine, Coastal and Shelf Science. Aug. 31, 2019;224:108-16. (Year: 2019).*

(Continued)

*Primary Examiner* — Vu Le
*Assistant Examiner* — Tracy Mangialaschi
(74) *Attorney, Agent, or Firm* — Tutunjian & Bitetto, P.C.; Stosch Sabo (57) ABSTRACT

Methods and systems for managing vegetation include training a machine learning model based on an image of a training data region before a weather event, an image of the training data region after the weather event, and information regarding the weather event. A risk score is generated for a second region using the trained machine learning model based on an image of the second region and predicted weather information for the second region. The risk score is determined to indicate high-risk vegetation in the second region. A corrective action is performed to reduce the risk of vegetation in the second region.

21 Claims, 8 Drawing Sheets

(51) Int. Cl.
*G06N 3/08* (2006.01)
*G06K 9/62* (2022.01)
*G06N 20/00* (2019.01)
*G06V 20/10* (2022.01)

(52) U.S. Cl.
CPC ............ *G06N 5/046* (2013.01); *G06N 20/00* (2019.01); *G06V 20/188* (2022.01); *G06T 2207/20081* (2013.01); *G06T 2207/20224* (2013.01); *G06T 2207/30188* (2013.01)

(58) Field of Classification Search
CPC .. G06K 9/00657; G06K 9/6256; G06K 9/627; G06T 7/0002; G06T 2207/20224; G06T 2207/30188; G06T 2207/20081; G06V 20/188; G06V 10/454
See application file for complete search history.

(56) References Cited

U.S. PATENT DOCUMENTS

| | | |
|---|---|---|
| 7,720,605 B2 | 5/2010 | Welty et al. |
| 8,494,774 B2 | 7/2013 | Pasken et al. |
| 9,069,104 B2 | 6/2015 | Datta et al. |
| 9,536,214 B2 | 1/2017 | Heng et al. |
| 10,755,357 B1 * | 8/2020 | Davis ................. G06K 9/00637 |
| 2016/0247076 A1 | 8/2016 | Mewes et al. |
| 2017/0032509 A1 * | 2/2017 | Mannar ..................... G06T 7/73 |
| 2018/0046910 A1 | 2/2018 | Greene |
| 2018/0156767 A1 | 6/2018 | Osborne et al. |

FOREIGN PATENT DOCUMENTS

| | | |
|---|---|---|
| CN | 108681715 A | 10/2018 |
| WO | 2019115873 A1 | 6/2019 |

OTHER PUBLICATIONS

Wanik, D. W., et al. "Storm outage modeling for an electric distribution network in Northeastern USA." Natural Hazards 79.2 (2015):1359-1384. (Year: 2015).*

Cerrai, Diego. "Predicting Weather-Caused Power Outages: Technique Development, Evaluation, Applications." (Apr. 24, 2019). (Year: 2019).*

Christopher M. Godfrey et al., "Estimating Enhanced Fujita Scale Levels Based on Forest Damage Severity", American Meteorological Society, Feb. 2017.

Weimin Xi et al., "Tree damage risk factors associated with large, infrequent wind disturbances of Carolina forests", Forestry, vol. 81, No. 3, May 2008.

International Search Report for PCT/IB2020/058917 dated Dec. 15, 2020 (7 pages).

* cited by examiner

PREDICTING AND CORRECTING VEGETATION STATE

BACKGROUND

The present invention generally relates to the maintenance of vegetation and, in particular, the prediction and identification of areas where vegetation will overgrow and potentially damage useful areas and need to be removed.

While satellite imaging can provide accurate, two-dimensional imaging of current vegetation encroachment on, for example, utilities, transportation infrastructure, and agriculture, it is difficult to predict how this vegetation will affect those uses during periods of adverse weather. Vegetation management can therefore be a labor-intensive process, where an inspector personally visits the assets in question to examine the type and state of vegetation and identifies vegetation to be removed.

SUMMARY

A method for managing vegetation includes training a machine learning model based on an image of a training data region before a weather event, an image of the training data region after the weather event, and information regarding the weather event. A risk score is generated for a second region using the trained machine learning model based on an image of the second region and predicted weather information for the second region. The risk score is determined to indicate high-risk vegetation in the second region. A corrective action is performed to reduce the risk of vegetation in the second region.

A method for managing vegetation includes training a machine learning model based on an image of a training data region before a weather event, an image of the training data region after the weather event, and information regarding the weather event, including differences between vegetation shown in the image of the training data region before the weather event and the image of the training data region after the weather event. A risk score is generated for a second region using the trained machine learning model based on an image of the second region and predicted weather information for the second region. The risk score is determined to indicate high-risk vegetation in the second region. A corrective action is performed to reduce the risk of vegetation in the second region.

A system for managing vegetation includes a model trainer configured to train a machine learning model based on an image of a training data region before a weather event, an image of the training data region after the weather event, and information regarding the weather event. A vegetation manager is configured to generate a risk score for a second region using the trained machine learning model based on an image of the second region and predicted weather information for the second region, to determine that the risk score indicates high-risk vegetation in the second region, and to trigger a corrective action to reduce the risk of vegetation in the second region.

A system for managing vegetation includes a model trainer configured to train a machine learning model based on an image of a training data region before a weather event, an image of the training data region after the weather event, and information regarding the weather event, including differences between vegetation shown in the image of the training data region before the weather event and the image of the training data region after the weather event. A vegetation manager is configured to generate a risk score for a second region using the trained machine learning model based on an image of the second region and predicted weather information for the second region, to determine that the risk score indicates high-risk vegetation in the second region, and to trigger corrective action to reduce the risk of vegetation in the second region.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use measurements of a present vegetation state, as well as information relating to weather and terrain data, to predict areas in which vegetation growth can potentially become hazardous to assets and personnel in times of adverse weather. For example, during times of strong winds or heavy snow, tree branches can fall across power lines and railroad tracks, necessitating emergency repair and removal. Historical data of damage events, as related to the location of the damage, severity of damage, proximity of manmade structures, power lines and the prevalent weather conditions, are considered to identify those trees that likely caused the damage. Additional information, like the length of power outage, lack of communication services, or damage to a house, is used to assess the severity of damage that may be created by a tree. Based on expert recommendations and best practices implemented by utility companies and local authorities, and taking into account local regulations, the best practices for a certain region regarding vegetation management are determined. Additional information, like tree type, age, health status, soil and surroundings, is also integrated into the model. The present embodiments therefore identify vegetation that is likely to cause problems and remove or trim the identified vegetation before it can cause damage.

Toward that end, the present embodiments employ machine learning techniques to identify changes in vegetation over time using, e.g., satellite imagery, and combine that information with terrain and weather information to identify areas where vegetation growth is likely to cause damage. The present embodiments use range-finding technologies, such as light detection and ranging (LIDAR), to build a map of terrain and to distinguish different kinds of features, such as trees and manmade structures. The present embodiments then act to create a map that identifies high risk vegetation that is likely to create problems under severe weather conditions or vegetation growth conditions and generates recommendations to prevent damage by removing the vegetation in question.

To identify regions of vegetation that are likely to cause damage, an artificial neural network (ANN) is trained on images that change over time (indicating, for example, the collapse of a tree) and is then used to identify regions that are likely to incur future damage. In the training process, information from the whole three dimensional distribution of Lidar data is considered to identify individual trees, or parts of trees (branches, top, trunk, etc.), that could potentially create damage. Such features may be identified in the LIDAR data as having reduced number of return points (indicating branches that are sick or damaged) or excessive return points that are not symmetrically distributed around the tree body (like an overgrown tree branch) or detect just the body of tree without leaves, indicating a dead tree.

An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 1:
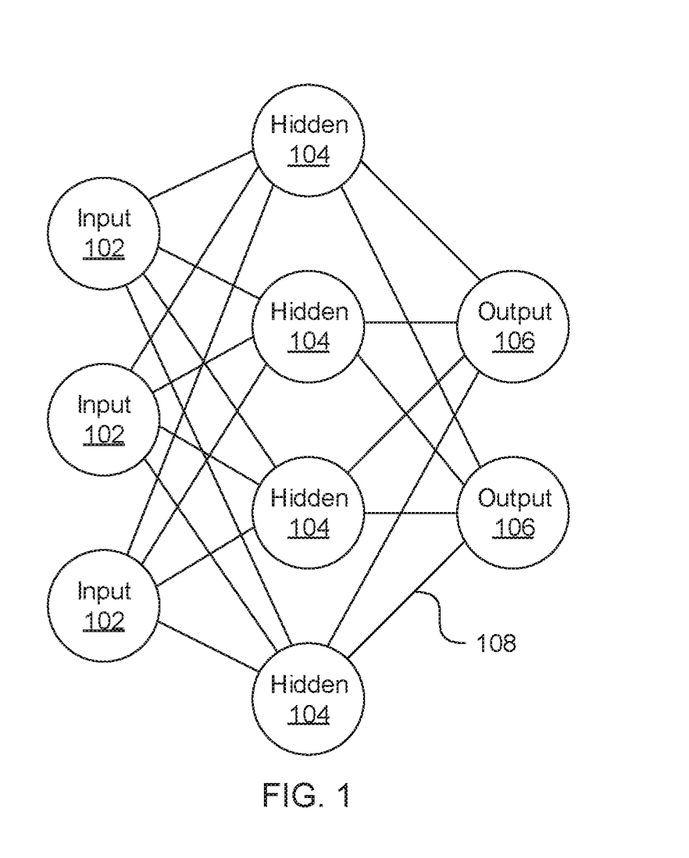
FIG. 1 is a diagram of a neural network model in accordance with an embodiment of the present invention.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
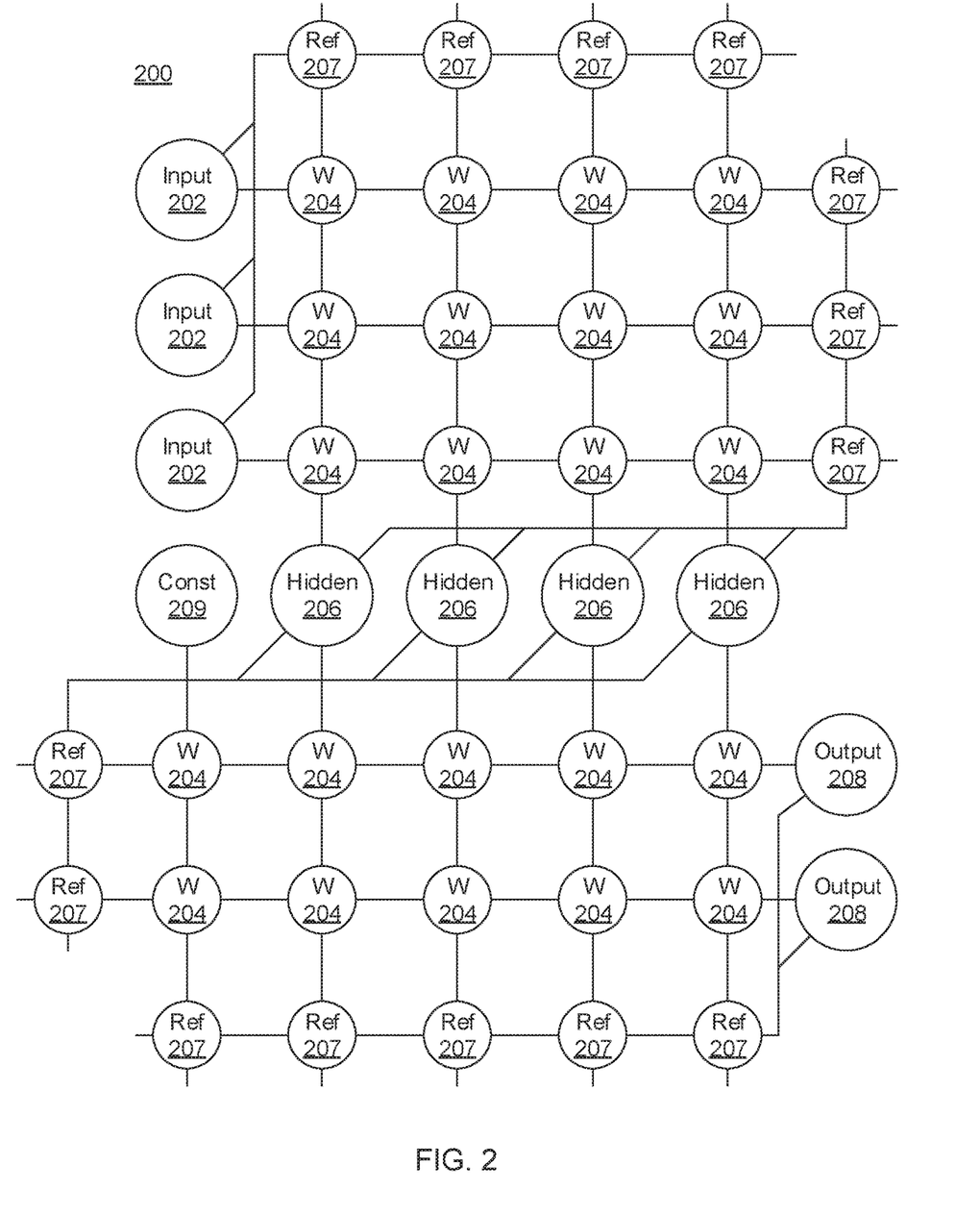
FIG. 2 is a diagram of a neural network architecture in accordance with an embodiment of the present invention.

Referring now to FIG. 2, an exemplary ANN architecture 200 is shown. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 202 each provide an input voltage in parallel to a respective row of weights 204. In the hardware embodiment described herein, the weights 204 each have a settable resistance value, such that a current output flows from the weight 204 to a respective hidden neuron 206 to represent the weighted input. In software embodiments, the weights 204 can simply be represented as coefficient values that are multiplied against the relevant neuron outputs.

Following the hardware embodiment, the current output by a given weight 204 is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The use of reference weights 207 is not needed in software embodiments, where the values of outputs and weights can be precisely and directly obtained. As an alternative to using the reference weights 207, another embodiment can use separate arrays of weights 204 to capture negative values.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages can be implemented, by interposing additional layers of arrays and hidden neurons 206. It should also be noted that some neurons can be constant neurons 209, which provide a constant output to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

As noted above, the weights 204 can be implemented in software or in hardware, for example using relatively complicated weighting circuitry or using resistive cross point devices. Such resistive devices can have switching characteristics that have a non-linearity that can be used for processing data. The weights 204 can belong to a class of device called a resistive processing unit (RPU), because their non-linear characteristics are used to perform calculations in the neural network 200. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 3:
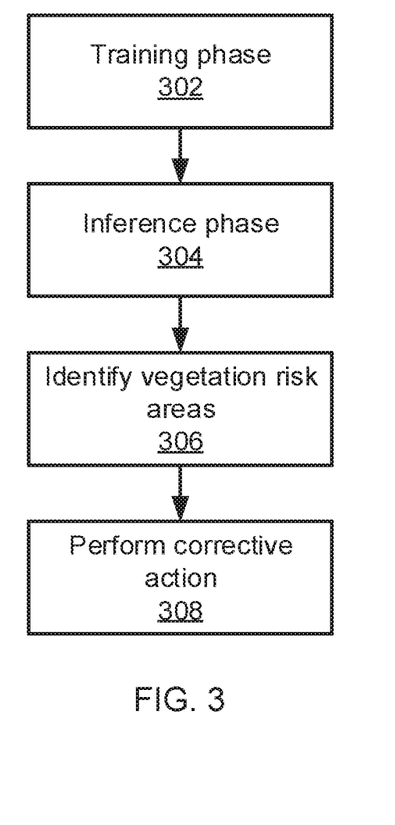
FIG. 3 is a block/flow diagram of a method for vegetation management that uses a machine learning model to identify areas of high-risk vegetation in accordance with an embodiment of the present invention.

Referring now to FIG. 3, a method of detecting and removing high-risk vegetation is shown. Block 302 performs a training phase for a machine learning model, for example training a neural network based on a set of training data that includes previously recorded vegetation measurements of given areas, separated in time, as well as weather data for the given areas. In some embodiments, the training data is labeled to identify regions of vegetation that have caused damage or have otherwise been identified as high-risk. The output of the training phase is a predictive model that accepts measurements of vegetation states and weather information and generates an output that indicates a risk level for the region in question. Although it is specifically contemplated that neural networks can be used to implement the machine learning model, as described above, it should be understood that any appropriate machine learning architecture can be used instead.

An inference phase 304 then makes new measurements of regions of interest and collects weather information to use as an input to the trained machine learning model. In some embodiments, the inference phase assigns a risk score to regions within a given image area, identifying particular sub-regions according to their scores or a range of scores. In some embodiments, the risk scores may be binary, simply identifying respective regions of high-risk and low-risk vegetation. In other embodiments, the risk scores can be discretely or continuously valued between zero and one. In yet other embodiments, the risk scores can be expressed as a number that begins at zero and can reach arbitrarily high values.

In some embodiments, the risk score can account for potential kinds of damage. For example, one risk index is the likelihood that a tree makes contact with, or falls on, a power line, road or dwelling. The present embodiments can estimate the height and canopy size of a tree and calculate, based on the tree's characteristics, if it might bend or tilt and make contact with the power line. The likelihood of touching a power line would then be a risk index, where no likelihood of touching corresponds to a zero risk index and a tree trunk falling on the line has a 100% risk index, with branches touching the power line would have a risk index between 0% and 100% based on the amount of overlap between the tree canopy and the power line.

In another embodiment, weather data characteristics are identified that created a certain damage on certain type of tree. The weather characteristics can include an amount of precipitation, snow, or wind gust that put down a tree or damage it. The trained model can will identify characteristics like wind, snow precipitation, tree height, tree age and tree species type, combined with distance to assets to identify similar regions.

In another embodiment the model can learn the type of terrain and soil type where damage has historically occurred, combined with local weather measurements to understand how weather parameters are affected by vegetation and terrain and create a hazardous conditions.

In another embodiment, the NN can learn about trees being uprooted or broken by an extreme weather condition and can learn on new images or areas, where damage data doesn't exist all, those locations where damage may occur.

Block 306 identifies vegetation risk areas. In some embodiments, this can include comparing the risk scores to a threshold value, such that regions having risk scores above a threshold value are identified as being high-risk regions. The risk score can be learned locally from training data and then generalized by the model across the whole area of interest. Block 308 then performs a corrective action based on the determinations of block 306. For example, block 308 can send a team of workers to the identified region(s) to cut back vegetation that will pose a risk to material and personnel. In other embodiments, block 308 can trigger automatic verification using, e.g., aerial drones or other automated units to physically visit and observe high-risk regions and, in some embodiments, to automatically perform vegetation maintenance actions such as trimming growth or deploying herbicide.

Figure 4:
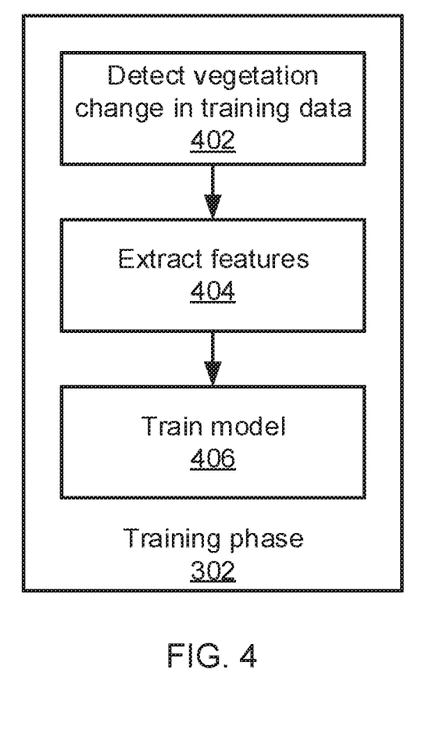
FIG. 4 is a block/flow diagram of a method for training a machine learning model to identify areas of high-risk vegetation in accordance with an embodiment of the present invention.

Referring now to FIG. 4, additional detail on the training phase 302 is shown. Block 302 accepts a set of training data as input. For example, the training data can include such information as satellite imagery, LIDAR imagery, ground conditions (such as ground surface normal direction), tree ages and conditions, terrain surface attributes, and intervening weather information. For example, the tree age, tree type, tree location, tree health, and tree canopy characteristics can represent labels for the training data and can include such features as indications that a given tree is upright, the presence of a fallen branch, or the presence of a fallen trunk, trunk width, asymmetries of a tree's crown with respect to its trunk, and trunk direction. Additional training data can be created around topography, land use, density of buildings, soil type, and weather patterns. It is specifically contemplated that the "after" imagery can be taken after some adverse weather event, such as high winds, heavy precipitation, or heavy snow. The intervening weather information is then regarded as the cause of changes to the vegetation between the "before" and "after" images.

Block 402 identifies changes in vegetation states based on before-and-after images in the training data. This detection of changes is described in greater detail below, but it should be understood that the image data that is used for the training phase can include a number of different components that make it possible to discriminate between terrain, foliage, and man-made structures. Thus, block 402 is able to detect when foliage that is present in a "before" image is absent in an "after" image. Block 404 extracts features from this detected vegetation change. In some embodiments, each change between the "before" images and the "after" images can be regarded as a fallen tree or branch and can therefore be interpreted as a "positive" sample. Negative samples are interpreted as those areas with no change or a below-threshold change, indicating that trees and branches have not fallen in those areas.

Thus, in some embodiments, positive samples that indicate high-risk vegetation areas include areas where change was detected. These changes can focus specifically on changes to vegetation, when it is possible to tell the difference between vegetation and other features, such as man-made structures. Changes to vegetation can then be grouped into contiguous regions or, alternatively, can be divided into sub-regions, down to the level of individual trees or even branches of a tree. Negative samples, which indicate low-risk vegetation areas, can then be determined by grouping together regions that do not feature changes after an extreme weather event. These regions can also be divided into sub-regions, down to the level of individual trees.

Block 406 then trains the model using the extracted features and the training data. Any appropriate training process can be used, for example by segregating training and testing samples within the training data, using the training samples to train the network, and then evaluating the accuracy of the trained network using the testing samples. Discrepancies between the output of the model and the expected output indicated by the training data can be corrected through, for example, backpropagation.

In some embodiments, the machine learning model can be implemented as an auto-encoder neural network that operates on input image data and uses k-means clustering or uses principal component analysis. In some embodiments, the machine learning model can be implemented as a u-net, which is a convolutional neural network that uses upsampling operators in the place of pooling operations to increase the resolution of the output.

Figure 5:
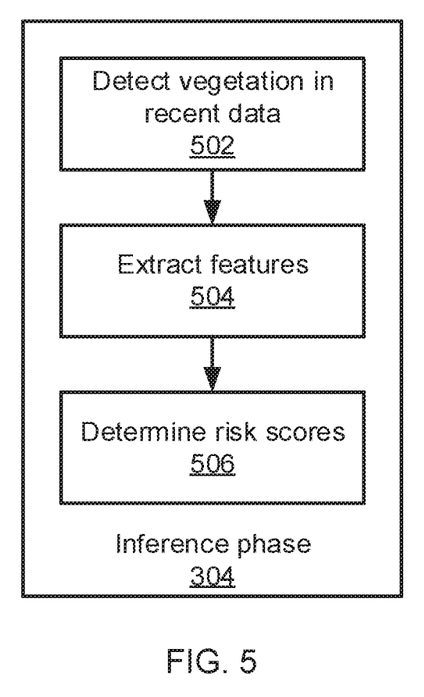
FIG. 5 is block/flow diagram of a method for identifying areas of high-risk vegetation using a machine learning model in accordance with an embodiment of the present invention.

Referring now to FIG. 5, additional detail on the inference phase 304 is shown. The inference phase takes current image information of areas in question and predicted weather information as an input. Block 502 detects vegetation in recent image data, for example using the same techniques as in block 402, described in greater detail below. Block 504 extracts features, for example by grouping together regions that show vegetation or by sub-dividing such regions into sub-regions that correspond to, e.g., individual trees. As in block 404, the features can be determined using a variety of different characteristics, including satellite imagery, LiDAR imagery, ground conditions, tree ages and conditions, terrain surface attributes, and intervening weather information. The extracted features are applied to the machine learning model in block 506, which generates a risk score output.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
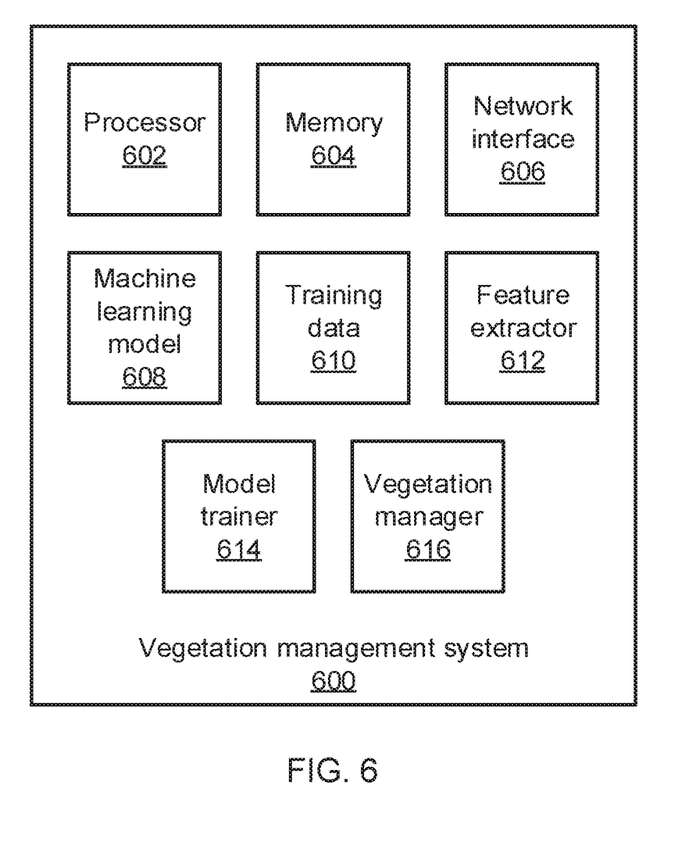
FIG. 6 is a block diagram of a vegetation management system that identifies and controls areas of high-risk vegetation using a machine learning model in accordance with an embodiment of the present invention.

Referring now to FIG. 6, a vegetation management system 600 is shown. The system 600 includes a hardware processor 602 and a memory 604. A network interface 606 further provides communication by any appropriate wired or wireless communications medium and protocol. For example, the network interface 606 can access recent image information for a region in question from, for example, a satellite image database. Additionally, the network interface can communicate with other agents to coordinate the management of high-risk vegetation.

A machine learning model 608 is configured to determine a risk score based on input features. These features can be, for example, images that include vegetation and additional weather information, along with a variety of other features like terrain, soil, and other as described above. The risk score output indicates a risk level for particular regions of the input images according to how likely vegetation in the regions is to cause damage during adverse weather conditions. The model is trained by model trainer 614 using a set of training data 610. The training data includes, for example, images taken before and after adverse weather conditions, as well as information regarding the intervening weather conditions. The model trainer 614 uses feature extractor 612 to identify features within the training data, for example by comparing the "before" images and the "after" images and identifying differences or changes between the images as instances of damage.

A vegetation manager 616 uses the machine learning model 608 to identify a risk score for new images of areas of interest. For example, the vegetation manager 616 can use the feature extractor to identify features in the new input images and provide these features as input to the machine learning model 608. For those regions with an above-threshold risk score, the vegetation manager 616 takes some corrective action, as described above.

Figure 7:
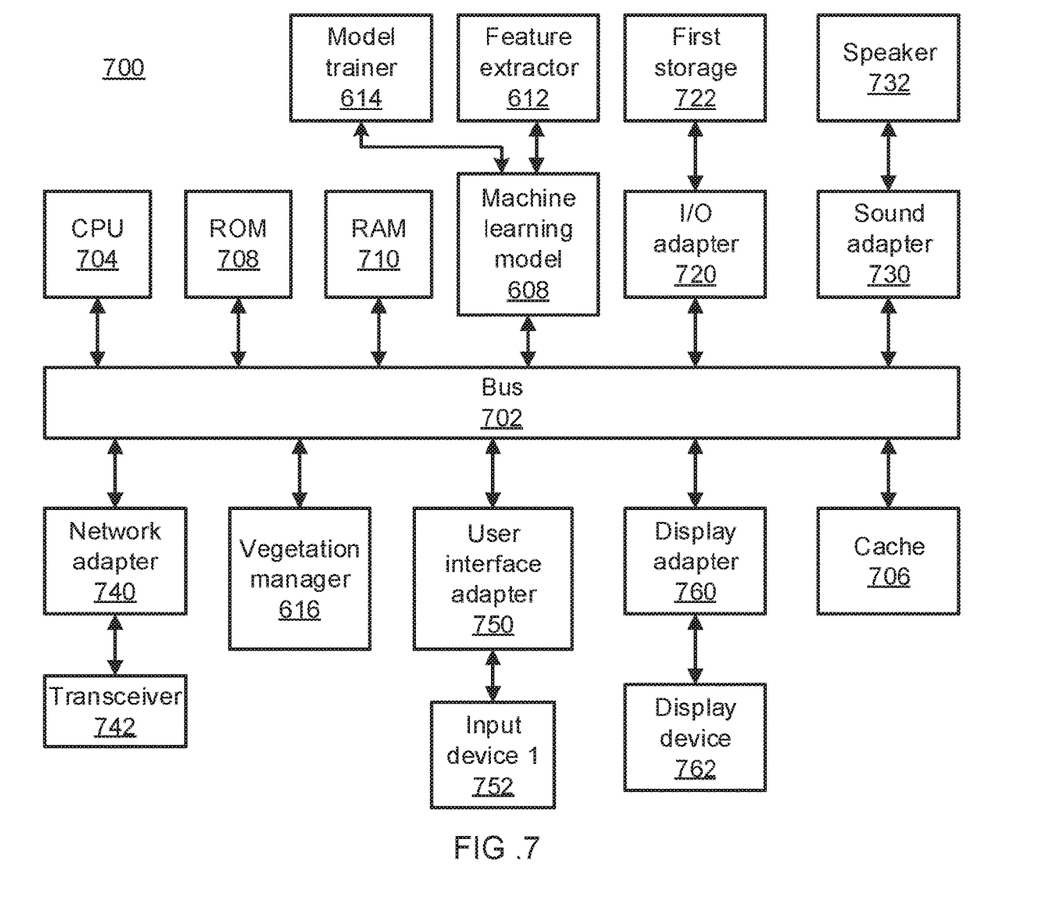
FIG. 7 is a block diagram of a processing system for vegetation management in accordance with an embodiment of the present invention.

Referring now to FIG. 7, an exemplary processing system 700 is shown which may represent the vegetation management system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 is operatively coupled to system bus 702 by the I/O adapter 720. The storage device 722 can be any of a disk storage device (e.g., a magnetic or optical disk storage device), a solid state magnetic device, and so forth. The storage device 722 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752 is operatively coupled to system bus 702 by user interface adapter 750. The user input device 752 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 722 can be the same type of user input device or different types of user input devices. The user input device 752 is used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Figure 8:
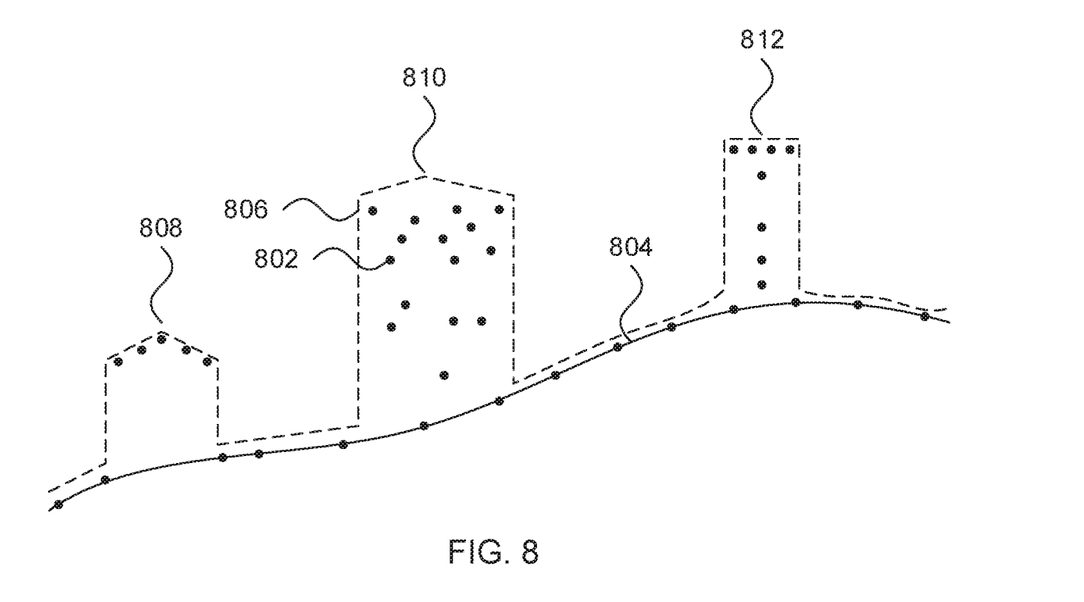
FIG. 8 is a diagram that shows a comparison between different elevation models to identify different kinds of terrain and structures in an image in accordance with an embodiment of the present invention.

Referring now to FIG. 8, a diagram shows how LIDAR information can be used to detect vegetation and other features in image data. The LIDAR information includes a set of LIDAR data points 802, which represent distances from the LIDAR camera. LIDAR operates by emitting a laser pulse and measuring an amount of time needed for a reflection to be returned to the point of origin. This information is converted to height/distance information. By considering the height information across different horizontal ranges, different types of features can be resolved.

A digital elevation model 804 identifies the underlying terrain by smoothing the LIDAR points 802 over a relatively large radius (e.g., 100 meters). This establishes the topographical contours of the ground level. A local maximum model 806 tracks local contours defined by the uppermost LIDAR points 802 within a local radius (e.g., 10 meters). A corresponding local minimum model (not shown) identifies contours defined by the lowest LIDAR points 802 within the local radius.

By combining these models, different types of features can be resolved. For example, by identifying areas where the local minimum model and the local maximum model 806 coincide, but are different from the digital elevation model 804, structures 808 can be identified. In these areas, a man-made structure creates a local deviation from the local terrain. In other areas, where there is a large difference between the local minimum model and the local maximum model 806 can indicate a region of vegetation 810, where the incomplete coverage allows some LIDAR pulses to reach the ground, while other LIDAR pulses are blocked by branches and leaves. Thus, in regions where the local minimum model and the local maximum model 806 differ by greater than a threshold value, the present embodiments can indicate the presence of vegetation.

Smaller structures 812, such as telephone or power line wires, can be identified by a similar combination of the local minimum model and local maximum model 806, with other structural features (such as the periodic presence of a telephone pole and a long, continuous structure shape) creates a distinct signature. In some cases, LIDAR pulses may be absorbed completely to create a gap in the digital elevation model 804, which can represent a body of water.

The output of this process can be in the form of, e.g., a false-color satellite image that identifies different structural, topographic, and vegetation features using different colors. Thus, when a region shows a substantial difference in the encoded value (e.g., a substantial color change), where the local elevation information has changed substantially, this change can be quickly discerned by subtracting an image before the change and an image after the change.

The same procedure can be followed for all data points that are returned from an image, as well as data points returned from a range of heights that may be representative for a certain type of tree or vegetation. The model is adjusted from small bushes, as well as large trees, to extract the imagery that is the used in the model to assess the risk. In one embodiment, the images can be created for trees that are 20 m in height or above and that have a small canopy size. This can represent pine trees, for example, which are easily broken by a large wind. The top can be also moved by a strong wind across a large distance, where the tree locations and the type of damage can be learned by the model.

The initial subtraction of one image from another can produce certain artifacts that result from imprecision in the LIDAR data. In such an instance, a structure can have one edge show as being new and one edge show as having disappeared, because the second image will have been taken at a slightly different position or angle. In such instances, local averaging removes these artifacts, leaving only true changes between the images.

When performing training, block 402 uses the different models to first identify vegetation within a before image and an after image and then subtracts the one image from the other to locate areas where vegetation has changed. During inference, block 502 similarly uses the different models to identify vegetation within a new image. This information can be combined with a variety of other types of data, in particular weather data, to identify regions of the new image that are likely to change.

In some embodiments, the LIDAR information can be represented as the set of N irregular data points:

$$X = \{X_i = (x_i, y_i, z_i)\}_{i=1 \ldots N}$$

where each data point $X_i$ has coordinates $(x_i, y_i, z_i)$. The term "irregular" reflects the definition:

$$0 < d^{(i,j)} = |u_i - u_j| \neq \text{const}$$

where u is a placeholder for x and y and the index pairs (i,j) label nearest neighbor coordinates u. In general, the term |·| could be replaced by any kind of norm on the two-dimensional vector space $\bar{X} = \{X: (x,y)\}$. For simplicity, the dimensions x, y, and z, are interpreted as representing longitude, latitude, and altitude, respectively. Each point $X_i$ can have M numerical properties $P_i^{j=1 \cdots M}$ associated with it. Such properties can include, for example, LIDAR laser light reflectance intensity, LIDAR laser light reflectance angle, etc.

To create a false-color image, the present embodiments can, for example, use the red channel to represent the overall global elevation in terms of a scale parameter L. A sliding window of order $$\left(\frac{L}{r}\right)^2$$

pixels is defined, where $0 < r < L$ is the scale setting the size of a single pixel of an image raster with regularly spaced pixel coordinates $(\tilde{x}_i, \tilde{y}_i)$, rather than the irregularly scattered points $(x_i, y_i)$, such that $d_{\tilde{u}}^{(i,j)} = |\tilde{u}_i - \tilde{u}_j| = r$. Any aggregation function on the data points can be applied, for example by averaging:

$$DEM(x, y) = \langle z \rangle_{\bar{X}|_{x,y}^L} = \frac{1}{K} \sum_{i:(x_i,y_i) \in \bar{X}|_{x,y}^L} z_i$$

where $$\bar{X}|_{x,y}^L = \{(x_i, y_i) \in \bar{X}: (x - x_i)^2 + (y - y_i)^2 < L^2\}$$

is the set of points used for aggregation relative to the coordinate (x,y). The normalization constant $K = |\bar{X}|_{x,y}^L|$ is the number of points in $\bar{X}|_{x,y}^L$. DEM(x,y) can then be evaluated on the set of Ñ regularly spaced image grid points:

$$\tilde{X} = \{(\tilde{x}_i, \tilde{y}_i)\}_{i=1 \ldots \tilde{N}}$$

to form the false color image. DEM can represent, for example, curve 804 in FIG. 8.

The spherical constraint above, $(x-x_i)^2 + (y-y_i)^2 < L^2$, is used solely for illustration and can be replaced by any appropriate geometric condition. The aggregation procedure as a whole can be replaced by a convolution kernel $k^L(x,y)$ such that:

$$DEM(x, y) = \sum_{i:(x_i,y_i) \in \bar{X}} k^L(x - x_i, y - y_i) z_i$$

where $$\int k^L(x, y) dx dy = 1$$

For example, a Gaussian can be used, where $$k^L(x, y) \sim e^{-\frac{x^2 + y^2}{L^2}}.$$

A Fourier kernel with appropriate low-pass filter for wavelengths larger than about 1/L is another option. As an alternative, any appropriate non-linear function F, such as the median, can be applied to the z values as well:

$$DEM(x,y) = F(\{z_i : (x_i, y_i) \in \bar{X}|_{x,y}^L\})$$

Having identified the global elevation model DEM, it can be used to remove the effect of overall terrain from other elevation models. For vegetation management, it is particularly useful to distinguish between semi-transparent objects, such as trees, from opaque objects, such as houses. A local scale l is introduced, where l is larger than the resolution scale r and smaller than the global scale L. Using a minimum filter, a local surface model can be defined as:

$$LSM(x,y) = \min(\{z_i : (x_i, y_i) \in \bar{X}|_{x,y}^l\}) - DEM(x,y)$$

In some embodiments, this can be used as the green channel of a false-color image. LEM can represent, for example, curve 814 of FIG. 8.

In a similar fashion, a local elevation model can be defined according to:

$$LEM(x,y) = \max(\{z_i : (x_i, y_i) \in \bar{X}|_{x,y}^l\}) - DEM(x,y)$$

This can be used as, e.g., the blue channel of a false color image. Note that LEM(x,y) is roughly equal to LSM(x,y) for opaque objects, while LHM(x,y) = LEM(x,y) - LSM(x,y) > 0 is a proxy height above the local ground for semi-transparent objects.

Having described preferred embodiments of predicting and correcting vegetation state (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for managing vegetation, comprising:
   training a machine learning model based on an image of a training data region before a weather event, an image of the training data region after the weather event, and information regarding the weather event, the training including identifying man-made structures in the training data region by comparing a local minimum model and a local maximum model to an elevation model;
   generating a risk score for a second region using the trained machine learning model based on an image of the second region and predicted weather information for the second region; and
   determining that the risk score indicates high-risk vegetation that poses a risk to a man-made structure in the second region.

2. The method of claim 1, wherein training the machine learning model comprises determining differences between the image of the training data region before the weather event and the image of the training data region after the weather event.

3. The method of claim 2, wherein training the machine learning model further comprises identifying changed portions of the training data region as a first type of sample and identifying unchanged portions of the training data region as second type of sample for use as labels during training.

4. The method of claim 1, wherein training the machine learning model further comprises identifying vegetation in the image of the training data region before the weather event and in the image of the training data region after the weather event.

5. The method of claim 4, wherein identifying vegetation in an image comprises comparing a local minimum model and a local maximum model of light detection and ranging (LIDAR) information.

6. The method of claim 5, wherein identifying vegetation in an image further comprises determining that vegetation is present in parts of the image where a difference between the local minimum model and the local maximum model exceeds a threshold.

7. The method of claim 1, wherein identifying man-made structures in an image further comprises determining that a man-made structure is present in a part of the training data region where the local minimum model and the local maximum model coincide, but are both different from the elevation model.

8. The method of claim 1, further comprising, performing a corrective action to reduce the risk of vegetation in the second region, wherein the corrective action includes generating a recommendation for vegetation removal to minimize a risk of vegetation damage to a man-made structure.

9. The method of claim 8, wherein the recommendation includes repeating said generating after vegetation removal has been performed to verify that the high-risk vegetation has been removed.

10. A computer-implemented method for managing vegetation, comprising:
    training a machine learning model based on an image of a training data region before a weather event, an image of the training data region after the weather event, and information regarding the weather event, including differences between vegetation shown in the image of the training data region before the weather event and the image of the training data region after the weather event, the training including identifying man-made structures in the training data region by comparing a local minimum model and a local maximum model to an elevation model;
    generating a risk score for a second region using the trained machine learning model based on an image of the second region and predicted weather information for the second region; and
    determining that the risk score indicates high-risk vegetation that poses a risk to a man-made structure in the second region.

11. A non-transitory computer readable storage medium comprising a computer readable program for managing vegetation, wherein the computer readable program when executed on a computer causes the computer to perform the steps of:
    training a machine learning model based on an image of a training data region before a weather event, an image of the training data region after the weather event, and information regarding the weather event, the training including identifying man-made structures in the training data region by comparing a local minimum model and a local maximum model to an elevation model;
    generating a risk score for a second region using the trained machine learning model based on an image of the second region and predicted weather information for the second region; and
    determining that the risk score indicates high-risk vegetation that poses a risk to a man-made structure in the second region.

12. A system for managing vegetation, comprising:
    a model trainer configured to train a machine learning model based on an image of a training data region before a weather event, an image of the training data region after the weather event, and information regarding the weather event, the training including identification of man-made structures in the training data region by comparing a local minimum model and a local maximum model to an elevation model; and
    a vegetation manager configured to generate a risk score for a second region using the trained machine learning model based on an image of the second region and predicted weather information for the second region, and to determine that the risk score indicates high-risk vegetation that poses a risk to a man-made structure in the second region.

13. The system of claim 12, wherein the model trainer is further configured to determine differences between the image of the training data region before the weather event and the image of the training data region after the weather event.

14. The system of claim 13, wherein the model trainer is further configured to identify changed portions of the training data region as a first type of sample and identifying unchanged portions of the training data region as second type of sample for use as labels during training.

15. The system of claim 12, wherein the model trainer is further configured to identify vegetation in the image of the training data region before the weather event and in the image of the training data region after the weather event.

16. The system of claim 15, wherein the model trainer is further configured to compare a local minimum model and a local maximum model of light detection and ranging (LIDAR) information.

17. The system of claim 16, wherein the model trainer is further configured to determine that vegetation is present in parts of the image where a difference between the local minimum model and the local maximum model exceeds a threshold.

18. The system of claim 12, wherein the model trainer is further configured to determine that a man-made structure is present in a part of the training data region where the local minimum model and the local maximum model coincide, but are both different from the elevation model.

19. The system of claim 12, wherein the vegetation manager is further configured to generate a recommendation for vegetation removal to minimize a risk of vegetation damage to a man-made structure.

20. The system of claim 19, wherein the vegetation manager is further configured to repeat the generation of the risk score after vegetation removal has been performed to verify that the high-risk vegetation has been removed.

21. A system for managing vegetation, comprising:
a model trainer configured to train a machine learning model based on an image of a training data region before a weather event, an image of the training data region after the weather event, and information regarding the weather event, including differences between vegetation shown in the image of the training data region before the weather event and the image of the training data region after the weather event, the training including identification of man-made structures in the training data region by comparing a local minimum model and a local maximum model to an elevation model; and
a vegetation manager configured to generate a risk score for a second region using the trained machine learning model based on an image of the second region and predicted weather information for the second region, and to determine that the risk score indicates high-risk vegetation that poses a risk to a man-made structure in the second region.

* * * * *